United States Patent
Smith

(10) Patent No.: US 7,911,286 B2
(45) Date of Patent: *Mar. 22, 2011

(54) MULTIPLEXED VOLTAGE AND CURRENT SIGNALING

(75) Inventor: David E Smith, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 92 days.

This patent is subject to a terminal disclaimer.

(21) Appl. No.: 12/417,442

(22) Filed: Apr. 2, 2009

(65) Prior Publication Data

US 2010/0253157 A1 Oct. 7, 2010

(51) Int. Cl.
*H03C 3/00* (2006.01)

(52) U.S. Cl. .......................................... 332/118; 324/234

(58) Field of Classification Search ................... 332/118; 324/234

See application file for complete search history.

(56) References Cited

U.S. PATENT DOCUMENTS

| | | | |
|---|---|---|---|
| 6,597,159 B2 * | 7/2003 | Yang | 323/283 |
| 2009/0243564 A1 * | 10/2009 | Kajita | 323/234 |
| 2009/0309510 A1 * | 12/2009 | Liu | 315/291 |

* cited by examiner

*Primary Examiner* — Joseph Chang

(57) ABSTRACT

Circuitry and methods are provided. Voltage and current of an electrical load are scaled, biased and alternately sampled to derive a multiplexed signal. The multiplexed signal is used to control an oscillator so as to provide a multiplexed frequency-modulated signal. The multiplexed frequency-modulated signal is processed to improve linearity and to time-correlate signal content with discrete samplings of the load voltage and current. Control of a printer or other device is performed using the processed signal.

15 Claims, 10 Drawing Sheets

MULTIPLEXED VOLTAGE AND CURRENT SIGNALING

BACKGROUND

Various electrical and electronic devices use circuitry for sensing power consumption by a load or loads. In a typical instance, such sensing requires detecting the voltage applied to the load, as well as the current through the load. The mathematical product of load voltage and load current corresponds to the instantaneous power consumption of the load. The load voltage, current and/or power can be provided as respective signals to control circuitry or other devices. Accordingly, the embodiments described hereinafter were developed in the interest of addressing the foregoing requirements.

BRIEF DESCRIPTION OF THE DRAWINGS

The present embodiments will now be described, by way of example, with reference to the accompanying drawings, in which.

DETAILED DESCRIPTION

Introduction

Means and methods for providing an electrically isolated, multiplexed frequency-modulated signal corresponding to a load voltage and a load current are provided by the present teachings. Voltage applied to a load and the current through the load are sensed. The respective voltage and current-sensing signals are scaled and biased to suitable levels. The scaled signals are sampled by a multiplexer in an ongoing, alternating manner. The resulting multiplexed analog signal is coupled to a modulator, which derives a multiplexed frequency-modulated digital signal corresponding to the load voltage and load current. The multiplexed frequency-modulated signal is frequency divided and communicated across an isolation barrier. The electrically isolated, multiplexed frequency-modulated signal can processed and used to control operations within a printing device or other apparatus.

In one embodiment, an apparatus includes multiplexer circuitry configured to provide a multiplexed signal by alternately sampling a first signal and a second signal. The apparatus also includes modulator circuitry configured to provide a first multiplexed frequency modulated signal by controlling an oscillator using the multiplexed signal. Additionally, logic circuitry is configured to provide a second multiplexed frequency-modulated signal by frequency dividing the first multiplexed frequency-modulated signal. The apparatus further includes control circuitry configured to control one or more aspects of the apparatus by way of the second multiplexed frequency-modulated signal.

In another embodiment, a printing apparatus includes an electrical load and signal derivation circuitry. The signal derivation circuitry is configured to provide a multiplexed frequency-modulated signal corresponding to a voltage applied to the electrical load and a current through the electrical load. The printing apparatus also includes signal processing circuitry configured to derive a first processed signal and a second processed signal from the multiplexed frequency-modulated signal. The printing apparatus is configured to be controlled using the first and second processed signals.

In yet another embodiment, a method includes deriving a multiplexed frequency-modulated signal corresponding to a load voltage and a load current. The method also includes communicating the multiplexed frequency-modulated signal across an electrical isolation barrier from a first voltage level to a second voltage level. Additionally, the method includes processing the multiplexed frequency-modulated signal so as to derive a first processed signal and a second processed signal. The method further includes using the first and second processed signals to control operations of a printer.

First Illustrative Embodiment

Figure 1:
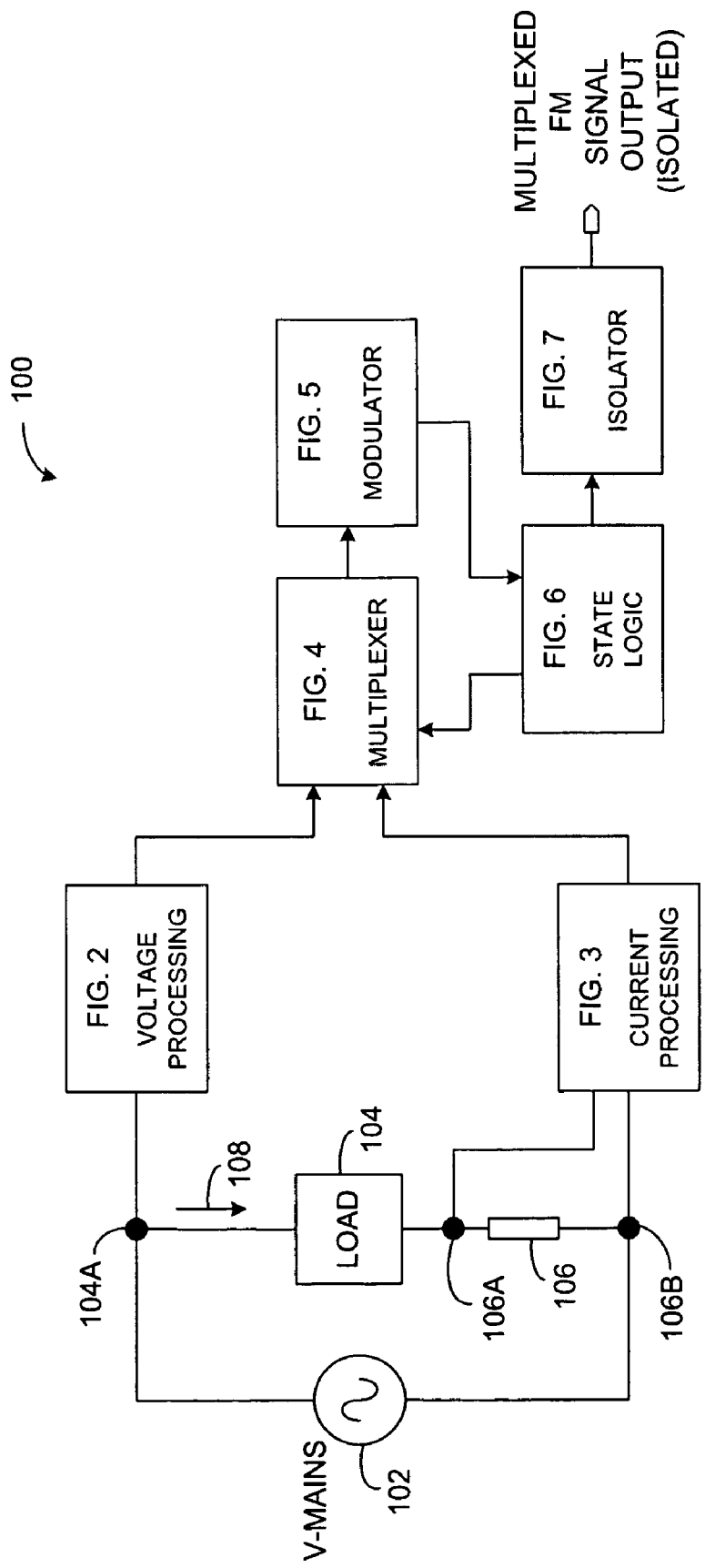
FIG. 1 depicts a block diagram of the interrelationship of FIGS. 2-7, which collectively depict signal derivation circuitry according to one embodiment.

An embodiment of signal derivation circuitry according to the present teachings is now described. Such signal derivation circuitry is shown by way of FIGS. 2-7, collectively. FIG. 1 is block schematic diagram 100 depicting the overall interrelationship of the circuitry depicted in FIGS. 2-7. It is to be understood that other embodiments of signal derivation circuitry can be used in accordance with the present teachings.

With reference to FIG. 1, a source of electrical potential (i.e., voltage) 102 is included. As shown, the source 102 is an alternating-current (AC) voltage source. Other sources being direct-current (DC) or AC in nature and of respectively different voltages can also be used. For purposes of non-limiting example, it is assumed that source 102 provides AC electrical energy of two-hundred thirty volts root-mean-square (RMS) potential at a frequency of sixty cycles per second (Hertz).

The diagram 100 also includes an electrical load 104. The load 104 can be any electrical component, device, circuit, or system that is electrically energized by way of the source 102. For purposes of non-limiting example, it is assumed that the load 104 is a printed media dryer for a printer. The load 104 is coupled to the source 102 by way of nodes 104A and 106A. For purposes of non-limiting example, it is assumed node 104A is at "line" potential, while node 106B is at nearly "neutral" potential.

The diagram 100 further includes a sensing resistor 106. In one embodiment, the sensing resistor is a model BVR-Z-R0005 available from Isotek Corporation, Swansea, Mass., USA. The sensing resistor 106 is directly connected to nodes 106A and 106B, with node 106B being at "neutral" potential as provided by source 102. The sensing resistor 106 is connected in series circuit arrangement with the load 104. The sensing resistor 106 is configured to provide an electrical potential at nodes 106A and 106B corresponding directly to the electrical current 108 carried by the load 104. Thus, the sensing resistor 106 serves to provide a voltage signal between nodes 106A and 106B that directly corresponds to the instantaneous current 108 through the load 104. The current 108 can also be referred to as "load current" 108.

The signal derivation circuitry collectively depicted by FIGS. 2-7 is coupled to nodes 104A, 106A and 106B, respectively. Thus, the signal derivation circuitry is connected to detect (i.e., sense) both the instantaneous voltage applied to the load 104, as well as the instantaneous current 108 carried by the load 104. An embodiment of signal derivation circuitry according to the present teachings is now described.

Figure 2:
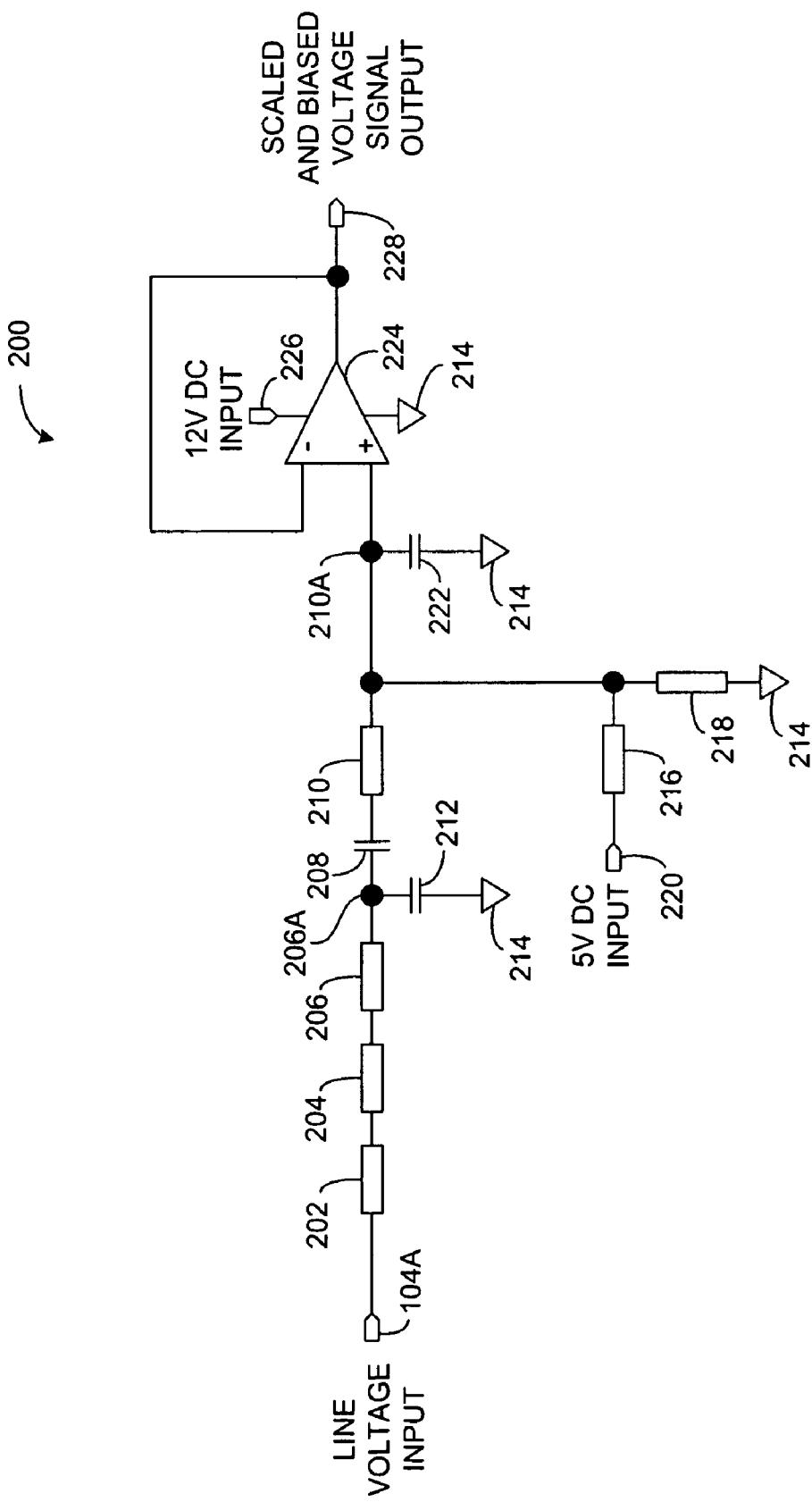
FIG. 2 depicts a schematic view of voltage signal processing circuitry according to the embodiment.

Referring now to FIG. 2, which depicts a schematic diagram of voltage signal processing circuitry 200. The circuitry 200 is coupled to one side of the potential provided by source 102 at node 104A. As described above, node 104A is at line potential (e.g., two-hundred thirty volts with respect to neutral node 106B). Thus, circuitry 200 is coupled to sense the voltage (with respect to a ground reference node) that energizes the load 104.

Circuitry 200 includes resistors 202, 204 and 206 coupled in series arrangement with an AC coupling capacitor 208 and another resistor 210. A filter capacitor 212 couples the series arrangement just described to ground potential 214 by way of node 206A. In another embodiment (not shown), the AC coupling capacitor 208 is omitted and DC coupling is established to node 104A. The elements 202-212 (inclusive) function to limit (i.e., scale) the electrical potential provided at a node 210A.

The circuitry 200 also includes resistors 216 and 218, which are connected in series arrangement between five volts of DC potential at a node 220 and ground potential at a node 214. The resistors 216 and 218 operate so as to bias the node 210A at a level greater than ground (i.e., zero) voltage potential. A filter capacitor 222 couples node 210A to ground node 214.

The circuitry 200 also includes an operational amplifier (i.e., op-amp) 224. The op-amp 224 is defined by, or as a portion of, a model LM358 Dual Operational Amplifier available from National Semiconductor Corporation, Santa Clara, Calif., USA. The op-amp 224 is connected to ground potential at node 214 and to twelve volts DC potential at node 226. The non-inverting input of the op-amp 224 is connected to the scaled and biased voltage signal at node 210A as described above. In turn, the inverting input of the op-amp 224 is coupled to the op-amp 224 output at a node 228. In this way, the op-amp 224 is configured to function as a unity gain buffer, coupling the scaled and biased voltage signal at node 210A to an output node 228.

Overall, the circuitry 200 operates to provide a scaled and biased (i.e., shifted) voltage signal at node 228 that corresponds to the load voltage sensed at node 104A. For purposes of non-limiting example, it is assumed that the voltage signal at node 228 is an AC signal superimposed on a DC bias so as to remain above ground potential, so long as the AC load voltage at node 104A remains within a predetermined range.

Table 1 below summarizes the values of the various components depicted in the voltage signal processing circuitry 200:

TABLE 1

| Voltage Signal Processing Circuitry 200 | | |
|---|---|---|
| Element/Device | Value/Model | Notes/Vendor |
| Resistor 202 | 221K | 0.25 W, 1% |
| Resistor 204 | 221K | 0.25 W, 1% |

TABLE 1-continued

| Voltage Signal Processing Circuitry 200 | | |
|---|---|---|
| Element/Device | Value/Model | Notes/Vendor |
| Resistor 206 | 221K | 0.25 W, 1% |
| Capacitor 208 | 0.22 uF | 50 V, 10% |
| Resistor 210 | 1.0K | 0.25 W, 1% |
| Capacitor 212 | 0.1 uF | 50 V, 10% |
| Resistor 216 | 1.0K | 0.25 W, 1% |
| Resistor 218 | 6.040K | 0.25 W, 1% |
| Capacitor 222 | 0.22 uF | 50 V, 10% |
| Op-Amp 224 | LM358 | National Semiconductor |

Figure 3:
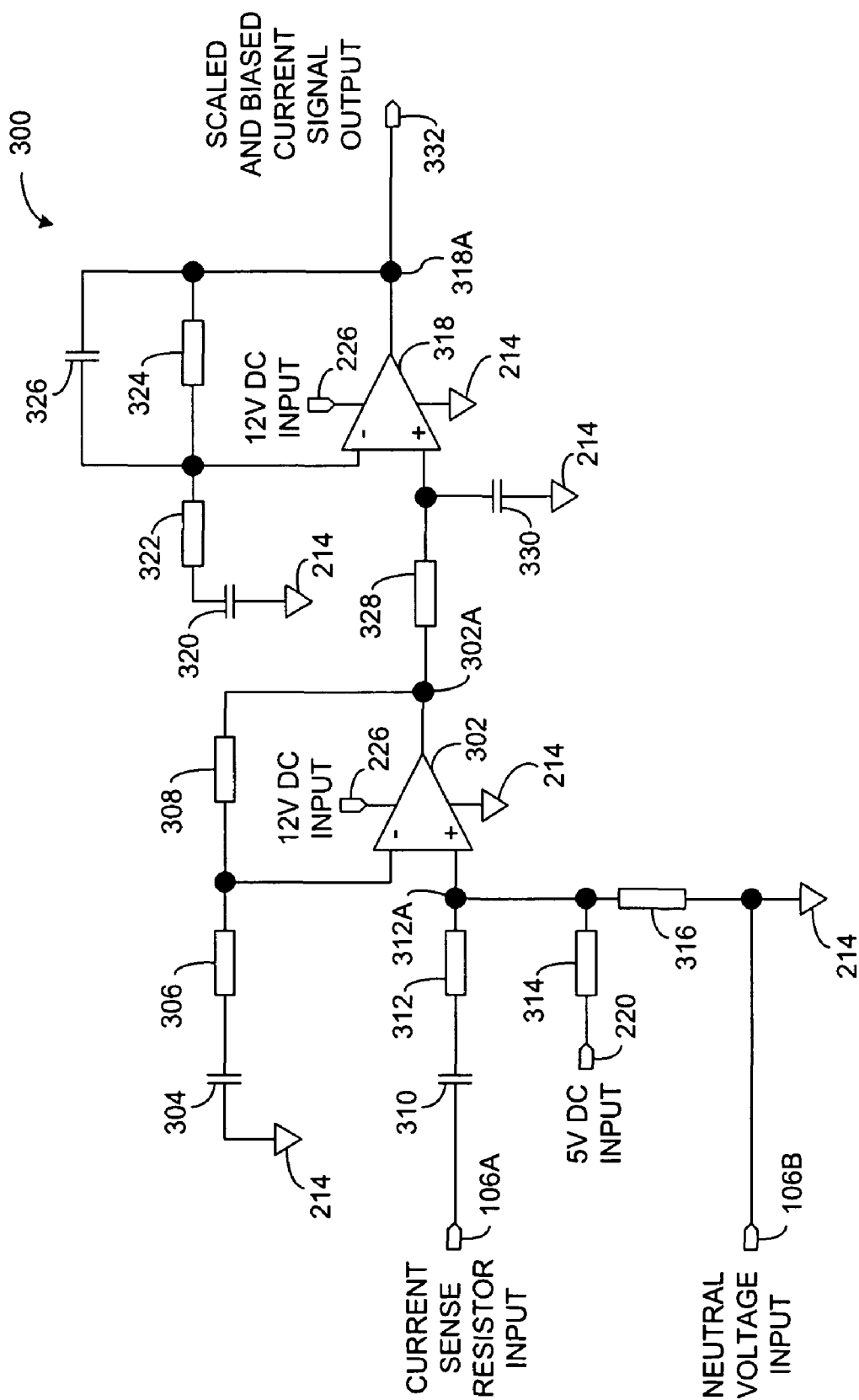
FIG. 3 depicts a schematic view of current signal processing circuitry according to the embodiment.

Referring now to FIG. 3, which depicts a schematic diagram of current signal processing circuitry 300. The circuitry 300 is coupled to one side of the current sense resistor 106 at node 106A. As described above, node 106A provides a voltage signal corresponding to the current 108 carried by load 104. The circuitry 300 is also coupled to neutral potential at node 106B.

The circuitry 300 includes an operational amplifier (op-amp) 302. The op-amp 302 is defined by, or as a portion of, a model LM358 Dual Operational Amplifier available from National Semiconductor Corporation, Santa Clara, Calif., USA. The op-amp 302 is connected to twelve volts DC potential at node 226 and ground potential at node 214. Capacitor 304 and resistors 306 and 308, and are configured to define a feedback circuit path from the output node 302A to the inverting input, respectively, of the op-amp 302. The non-inverting input of the op-amp 302 is coupled to receive the current sensing signal at a node 312A by way of an AC coupling capacitor 310 and a resistor 312. As such, the op-amp 302 and associated components 304-312 are configured to define a non-inverting amplifier.

The circuitry 300 also includes resistors 314 and 316. The resistors 314-316 are coupled to five volts potential at node 220 and ground potential at node 214. The resistors 314-316 are configured to provide a DC bias level to the node 312A at greater than ground potential. In this way, the node 312A carries the AC current sensing signal superimposed on a DC bias voltage. It is noted that the DC bias voltage at node 321A can be selected (by way of component values, etc.) to be different than the DC bias voltage at node 210A. In this way, signal content corresponding to the load voltage (i.e., node 104A) and the load current (i.e., node 106A) can be respectively identified within the multiplexed, frequency-modulated signal (i.e., node 716) that is derived according to the present teachings. Specifically, the use of different DC bias voltages results in different average frequencies for the load voltage and load current signal content, respectively, within the multiplexed, frequency-modulated signal.

The op-amp 302 operates to scale (i.e., amplify) and buffer the signal at node 312A and provide a corresponding voltage signal, representative of the current 108, at the output node 302A. In another embodiment (not shown), the capacitors 304 and/or 310 can be omitted, and DC coupling of the current sense signal at node 106A is established.

The circuitry 300 further includes another operational amplifier 318. The op-amp 318 is defined by, or as a portion of, a model LM358 Dual Operational Amplifier available from National Semiconductor Corporation, Santa Clara, Calif., USA. The op-amp 318 is connected to twelve volts DC potential at node 226 and ground potential at node 214. A capacitor 320, resistors 322 and 324, and a capacitor 326 are configured to define a feedback circuit path from the output node 318A to the inverting input, respectively, of the op-amp 318.

The non-inverting input of the op-amp 318 is coupled to receive the scaled, biased and buffered current-sensing signal at node 302A by way of a resistor 328. Additionally, a filter capacitor 330 couples the non-inverting input of the op-amp 318 to ground potential at node 214. As such, the op-amp 318 and associated components 320-330 are configured to define a non-inverting amplifier. While FIG. 3 depicts the output at node 332 as a "current" signal, it is to be appreciated that the signal at node 332 is in fact a voltage signal directly correspondent to the load current 108.

Table 2 below summarizes the values of the various components depicted in current signal processing circuitry 300:

TABLE 2

Current Signal Processing Circuitry 300

| Element/Device | Value/Model | Notes/Vendor |
| --- | --- | --- |
| Op-Amp 302 | LM358 | National Semiconductor |
| Capacitor 304 | 27 uF | 50 V, 20% |
| Resistor 306 | 11.0K | 0.25 W, 1% |
| Resistor 308 | 75.0K | 0.25 W, 1% |
| Capacitor 310 | 27 uF | 50 V, 20% |
| Resistor 312 | 5.00K | 0.1 W, 1% |
| Resistor 314 | 105K | 0.1 W, 1% |
| Resistor 316 | 470K | 0.1 W, 1% |
| Op-Amp 318 | LM358 | National Semiconductor |
| Capacitor 320 | 27 uF | 50 V, 20% |
| Resistor 322 | 10.0K | 0.25 W, 1% |
| Resistor 324 | 25.0K | 0.25 W, 1% |
| Capacitor 326 | 12.0 nF | 50 V, 20% |
| Resistor 328 | 68.1K | 0.25 W, 1% |
| Capacitor 330 | 1.0 nF | 50 V, 20% |

Figure 4:
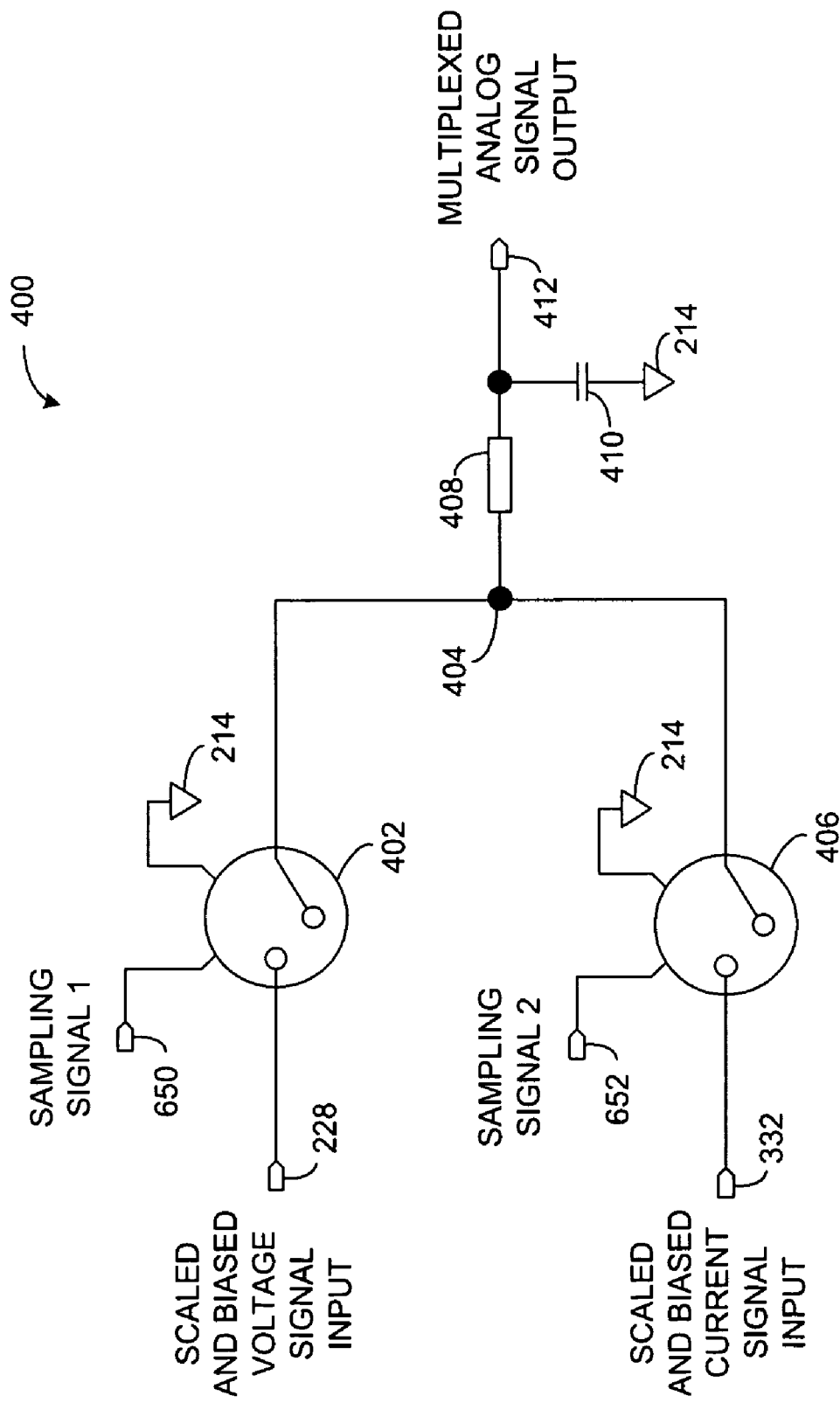
FIG. 4 depicts a schematic view of multiplexer circuitry according to the embodiment.

Reference is node made to FIG. 4, which depicts a schematic diagram of multiplexer circuitry 400. The circuitry 400 includes a multiplexer 402. The multiplexer 402 is defined by, or as a portion of, a model MC14053 Analog Multiplexer/Demultiplexer available from ON Semiconductor, Phoenix, Ariz., USA. The multiplexer 402 is configured to selectively couple (i.e., sample, or switch) the scaled and biased voltage signal at node 228 to a node 404 in accordance with a voltage sampling control signal at a node 650. The source of the voltage sampling control signal 650 is described in detail hereinafter. The multiplexer 402 is also connected to ground potential at node 214.

The circuitry 400 also includes a multiplexer 406. The multiplexer 406 is defined by, or as a portion of, a model MC14053 Analog Multiplexer/Demultiplexer available from ON Semiconductor, Phoenix, Ariz., USA. The multiplexer 406 is configured to selectively couple the scaled and biased current signal at node 332 to the node 404 in accordance with a current sampling control signal at a node 652. The source of the current sampling control signal 652 is described in detail hereinafter. The multiplexer 406 is also connected to ground potential at node 214. The circuitry 400 also includes a resistor 408 that couples the node 404 to an output node 412. A filter capacitor 410 couples the output node 412 to ground node 214.

During normal operation, the circuitry 400 functions to sample the voltage signal at node 228, and then the current signal at node 332, and then the voltage signal at node 228 again, and so on, and to provide those respective, alternating samples to the output node 412. The operation of the multiplexer circuitry 400 is controlled according to the signals at node 650 and 652 as described hereinafter. A multiplexed analog signal consisting of alternating voltage and current (representation) samples is thus provided at output node 412. In another embodiment, additional and/or other signals can be sampled into the multiplexed analog signal. Non-limiting examples of such signals include one or more calibration reference signals, one or more DC bias level signals, etc.

Table 3 below summarizes the values of the various components depicted in current signal processing circuitry 400:

TABLE 3

Multiplexer Circuitry 400

| Element/Device | Value/Model | Notes/Vendor |
| --- | --- | --- |
| Multiplexer 402 | MC14053 | ON Semiconductor |
| Multiplexer 406 | MC14053 | ON Semiconductor |
| Resistor 408 | 2.2K | 0.25 W, 1% |
| Capacitor 410 | 1.0 nF | 50 V, 20% |

Figure 5:
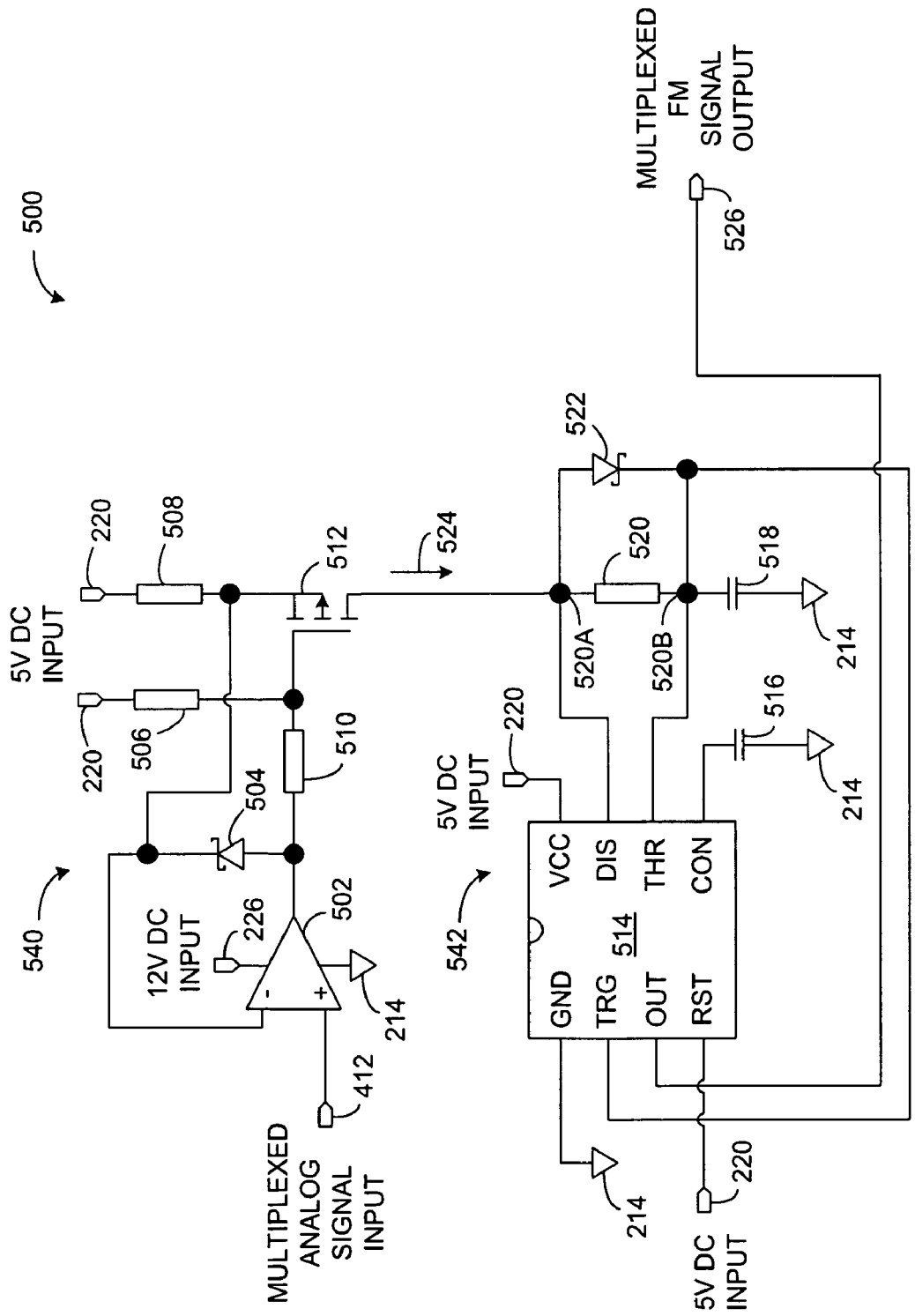
FIG. 5 depicts a schematic view of modulator circuitry according to the embodiment.

Referring now to FIG. 5, which depicts a schematic view of modulator circuitry 500. The circuitry 500 includes an operational amplifier (op-amp) 502. The op-amp 502 is defined by, or as a portion of, a model LM358 Dual Operational Amplifier available from National Semiconductor Corporation, Santa Clara, Calif., USA. The op-amp 502 is connected to ground potential at node 214 and to twelve volts DC potential at node 226. The non-inverting input of the op-amp 502 is connected to the multiplexed analog signal at node 412 as described above.

The circuitry 500 includes a Schottky diode 504, resistors 506, 508 and 510, and a transistor 512. The transistor 512 is defined by a P-channel metal-oxide semiconductor field-effect transistor (MOSFET), being model BSS84 available from Fairchild Semiconductor Corporation, San Jose, Calif., USA. The op-amp 502, Schottky diode 504, resistors 506-510 and transistor 512 are coupled and configured to define a voltage-to-current converter 540, wherein the current path is driven by five volts of DC potential at node 220.

The circuitry 500 includes an integrated circuit (IC) timer 514. The integrated circuit 514 is defined by model NE555 Timer available from Fairchild Semiconductor Corporation, San Jose, Calif., USA. The timer 514 is coupled to five volt energy at node 220 and ground potential at node 214. The timer 514 is also coupled to capacitor 516, timing capacitor 518, resistor 520 and Schottky diode 522. The timer 514 is configured to operate as an oscillator 542 by way of the cyclic charging and discharging of the capacitor 518 through the resistor 520. Further operation of the timer 514 and corresponding oscillator 542 is described hereinafter.

During normal operation, the circuitry 500 performs as follows: the multiplexed analog signal at node 412 is provided to the op-amp 502. In turn, the op-amp 502 and elements 504-512 function to convert the instantaneous signal (i.e., an analog voltage) at node 412 to a current signal 524. The current signal 524 charges the capacitor 518 through resistor 520. The voltage across capacitor 518 is sensed by the timer 514 at node 520B. During the charging of the capacitor 518, the output signal from the timer 514 at node 526 is asserted "high" (i.e., toward five volts DC).

Once the capacitor 518 voltage at node 520B rises to a predetermined threshold level (e.g., ten-thirds of a volt, etc.), the timer 514 provides ground potential at node 520A, which serves to sink the current 524 and to discharge the capacitor 518 through the resistor 520. During the discharging of the capacitor 518, the output signal at node 526 is asserted "low" (i.e., toward ground potential). Once the capacitor 518 voltage decays to a predetermined lower threshold (e.g., five-thirds of a volt, etc.), the timer 514 discontinues the ground potential at node 520A, and the capacitor begins charging once again by virtue of the current 524.

It is important to note that the operation of circuitry 500 is such that the current signal 524 corresponds exclusively to either load voltage (i.e., node 104A) or load current (i.e., node 106A) during a given charge cycle of capacitor 518. That is, each charge period of the capacitor 518 is representative of either load voltage or load current—but not both. In this way, a signal is provided at node 526 that is defined by a stream of digital pulses of respectively varying widths (i.e., on times) representing load voltage and load current samplings in alternating order (e.g., load voltage, load current, load voltage, load current, . . . ). This digital output signal at node 526 is referred to as a multiplexed frequency-modulated (FM) signal for purposes herein.

Table 4 below summarizes the values of the various components depicted in modulator circuitry 500:

TABLE 4

Modulator Circuitry 500

| Element/Device | Value/Model | Notes/Vendor |
|---|---|---|
| Op-Amp 502 | LM3358 | National Semiconductor |
| Schottky 504 | BAT54 | Philips Semiconductor |
| Resistor 506 | 10K | 0.1 W, 1% |
| Resistor 508 | 75.00K | 0.1 W, 1% |
| Resistor 510 | 100 Ohms | 0.1 W, 1% |
| Transistor 512 | BSS84 | Fairchild Semiconductor |
| Timer 514 | NE555 | Fairchild Semiconductor |
| Capacitor 516 | 10 nF | 50 V, 10% |
| Capacitor 518 | 1.0 nF | 50 V, 10% |
| Resistor 520 | 25.00K | 0.1 W, 1% |
| Schottky 522 | BAT54 | Philips Semiconductor |

The oscillator 542, which is based on the timer 514 and associated components, functions to provide a multiplexed frequency-modulated (FM) signal that clocks the operation of a flip-flop 602 (described hereinafter). The instantaneous operating frequency of the oscillator 542 is determined by the instantaneous current 524 provided by the voltage-to-current converter 540. Thus, the multiplexed frequency-modulated output signal at node 526 corresponds to the load voltage at node 104A and the load current 108 during respective, alternating periods (see FIG. 8). The instantaneous frequency of the FM signal at node 526 decreases as the instantaneous value of the signal being sampled (load voltage or load current) increases.

As described above, the oscillator 542 functions by virtue of charging and discharging of the capacitor 518. During operation, each timing period is comprised of a charge time (Tc) and a discharge time (Td), such that each period (P) is defined as: P=Tc+Td. Operating frequency (F) for the oscillator 542 is defined as the reciprocal of the period, or: F=1/P. During each charge time Tc, the nature and rate of the voltage increase (dV/dT) across the capacitor 518 corresponds directly to the current 524. If the current 524 is constant during a given charge time Tc, then the voltage rise across the capacitor 518 increases linearly with respect to time. During each discharge time Td, the voltage decay across the capacitor 518 is non-linear (i.e., logarithmic) by virtue of the simple resistor-capacitor circuit arrangement.

Typically, but not necessarily, the present teachings contemplate the selection of circuit component values (e.g., capacitor 518, resistor 520, etc.) and voltage-to-current conversion gain that result in a charge time Tc that is significantly greater than the discharge time Td for each timing period. Under such a scheme, a generally linear correspondence between sampled signal value (load voltage or load current) and multiplexed signal frequency (node 526) is achieved.

Figure 6:
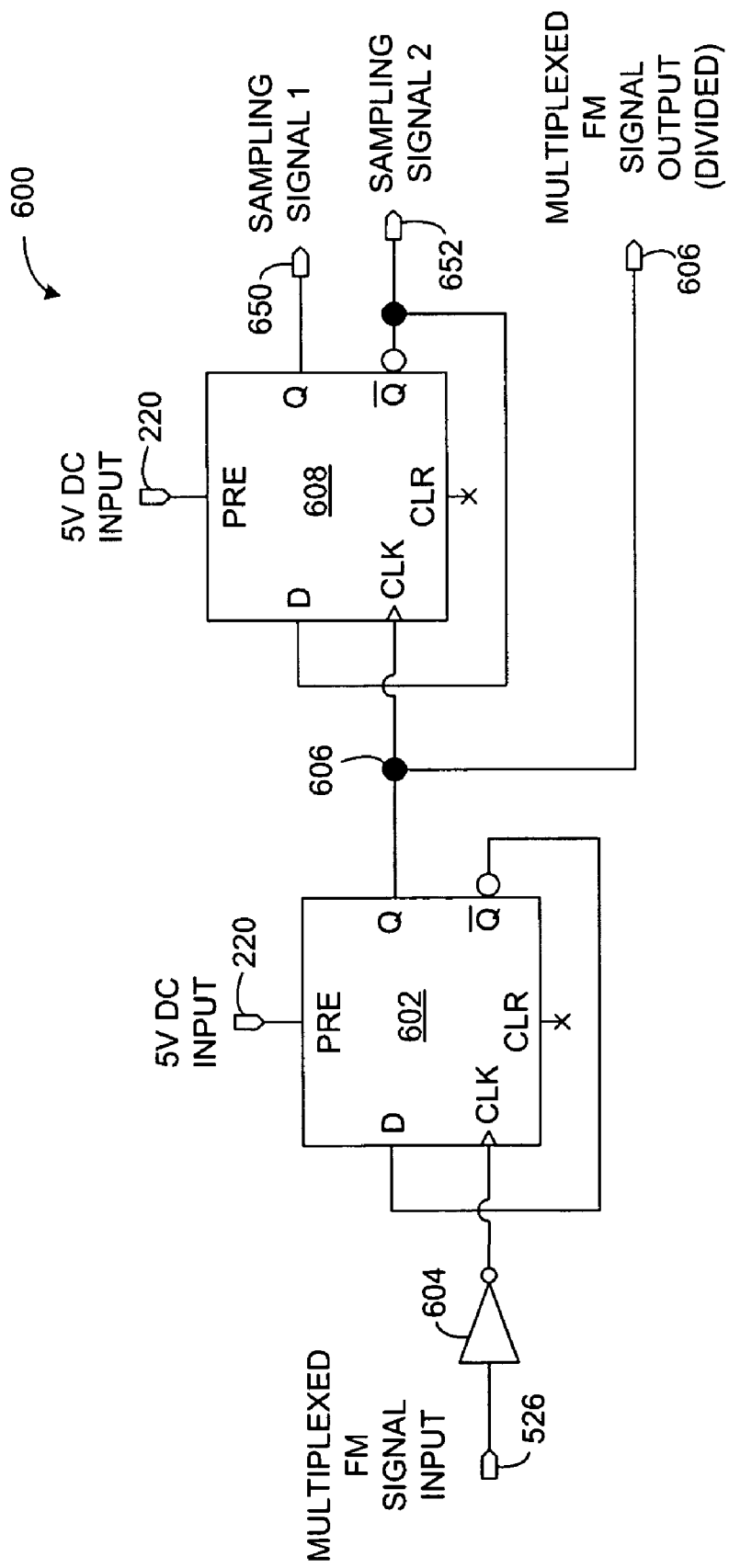
FIG. 6 depicts a schematic view of logic circuitry according to the embodiment.

Reference is now made to FIG. 6, which depicts a schematic view of logic circuitry 600. The circuitry 600 includes a "D" or data-type flip-flop 602. The flip-flop 602 is defined by a model MC74HC74A available from On Semiconductor, Phoenix, Ariz., USA. The flip-flop 602 is coupled to five volts of DC potential at node 220, as well as ground potential (not shown). The circuitry also includes an inverting Schmitt trigger 604. One suitable model of Schmitt trigger 604 is type MC74HC14A available from On Semiconductor, Phoenix, Ariz., USA. The Schmitt trigger 604 is coupled to receive the multiplexed frequency-modulated signal at node 526 and to provide a corresponding inverted output signal to trigger (or "clock") operations of the flip-flop 602. The flip-flop 602 provides a digital output signal at node 606, referred to herein as a divided multiplexed frequency-modulated signal. The flip-flop 602 performs divide-by-two frequency division of the multiplexed frequency-modulated signal at node 526.

The circuitry 600 further includes another "D" type flip-flop 608. The flip-flop 608 is defined by a model MC74HC74A available from On Semiconductor, Phoenix, Ariz., USA. The flip-flop 608 is configured to be triggered (or clocked) by the divided multiplexed frequency-modulated signal at node 606. In turn, the flip-flop 608 performs divide-by-two frequency division of the signal at node 606, providing an output signal at node 650 and an inverted form of that output signal at node 652. These output signals are also referred to as voltage sampling control signal 650 and current sampling control signal 652, respectively, and are coupled to the multiplexer circuitry 400 as described above.

Operation of the logic circuitry 600 causes the multiplexer circuitry 400 to switch between sampling the load voltage signal at node 228 and the load current signal at node 332. This sampling switch-over (i.e., toggling) occurs contemporaneous with the discharge of capacitor 518 of the modulator circuitry 500, while node 520A is being held at (or near) ground potential. Additionally, the voltage level at node 412 settles during the switch-over period and before the beginning of the next capacitor 518 charge cycle. The current 524 is ignored during the sampling switch-over period such that the resulting transient in current 524 has no adverse effect on the multiplexed frequency-modulated signal derived by the modulator circuitry 500. The synchronized operation of circuits 400, 500 and 600 result in desirable signal quality and noise reduction in the multiplexed frequency-modulated signal at node 606.

As described above, the circuitry 600 operates to perform a number of functions: frequency division of the multiplexed frequency-modulated signal generated by the modulator circuitry 500; and generation of synchronized voltage and current sampling control signals that are provided to the multiplexer circuitry 400. In this way, the logic circuitry 600 performs synchronization and control within the signal derivation circuitry of the present teachings.

The present teachings contemplate processing the divided multiplexed frequency-modulated voltage signal provided at node 606 so as to filter out the effects of the discharge time Td. Such subtraction of the Td characteristic—also referred to as removal of offset signal content—results in a favorable increase in the effective linearity of the derived signal.

Table 5 below summarizes the values of the various components depicted in logic circuitry 600:

TABLE 5

Logic Circuitry 600

| Element/Device | Value/Model | Notes/Vendor |
|---|---|---|
| Flip-Flop 602 | MC74HC74A | ON Semiconductor |
| Schmidt Trig. 604 | MC74HC14A | ON Semiconductor |
| Flip-Flop 608 | MC74HC74A | ON Semiconductor |

Figure 7:
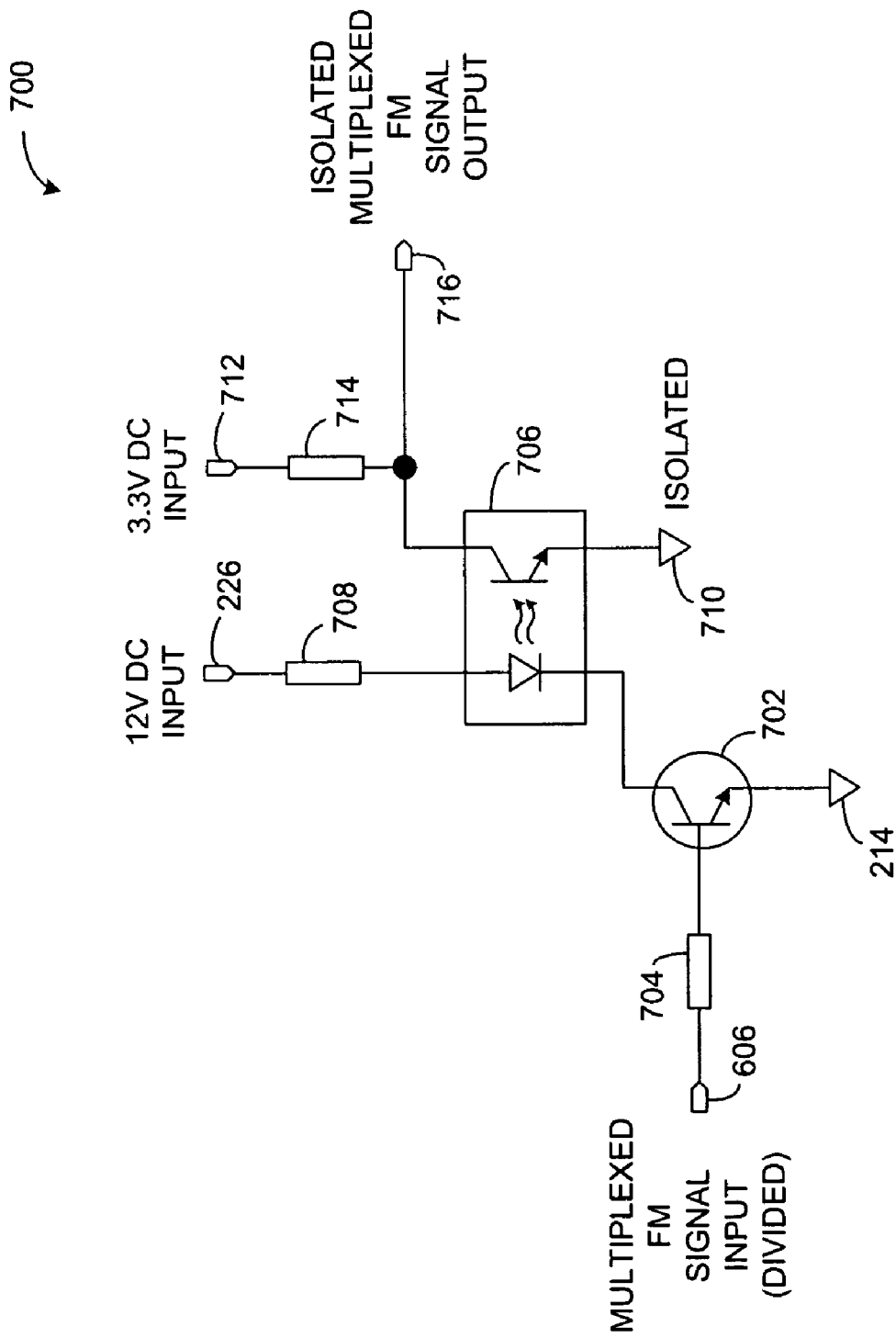
FIG. 7 depicts a schematic view of isolation barrier circuitry according to the embodiment.

Referring now to FIG. 7, which depicts a schematic view of isolation circuitry 700. The circuitry 700 includes a transistor 702. The transistor 702 is an NPN bipolar transistor. One suitable model of transistor 702 is type 2N2222 available from Micro Commercial Components, Chatsworth, Calif., USA. Other suitable transistors can also be used. The transistor 702 includes an emitter connected to ground potential at node 214, and a base coupled to node 606 by way of a resistor 704. The (divided) multiplexed frequency-modulated signal described above is provided at node 606.

The circuitry 700 also includes an optical isolator (opto-isolator or optocoupler) 706. The opto-isolator 706 is a model 4N25 available from Fairchild Semiconductor Corporation, San Jose, Calif., USA. The collector of the transistor 702 is connected to the cathode side of an optical emitter (i.e., light emitting diode) internal to the opto-isolator 706. In turn, the anode side of the optical emitter is coupled to twelve volts DC potential at node 226 through a resistor 708.

The opto-isolator 706 includes an internal phototransistor, of which the emitter is connected to an isolated ground potential at node 710. It is important to note that the ground potential at node 710 is electrically isolated and distinct from the ground potential at node 214. The collector of the phototransistor is biased toward three-point-three volts DC potential at node 712 by way of a resistor 714. Other suitable voltages can also be used. However, it is important to note that the potential at node 712 and its associated ground potential at node 710 define an electrical domain that is isolated and distinct from that of the potential at node 226 and associated ground 214. The opto-isolator 706 serves as an electrical barrier between two distinct voltage levels (i.e., electrical domains). The collector of the opto-isolator 706 provides an output signal at a node 716.

During normal operation, the circuitry 700 performs as follows: the divided multiplexed frequency-modulated voltage signal at node 606 is coupled to the base of transistor 702. In turn, the transistor 702 operates to drive the input side of the opto-isolator with an inverted form of the FM signal at node 606. The opto-isolator 706 communicates the input signal across the electrical isolation barrier from the first electrical domain (i.e., twelve volts) to the second electrical domain (i.e., three-point-three volts) by way of internal light wave signaling. Thus, the FM voltage signal at node 606, in inverted and level-shifted form, is effectively communicated to output node 716 by way of the opto-isolator 706. The multiplexed, frequency-modulated voltage signal at node 716 can be routed as needed or desired for use in controlling other circuitry or equipment.

Table 6 below summarizes the values of the various components depicted in isolation circuitry 700:

TABLE 6

Isolation Circuitry 700

| Element/Device | Value/Model | Notes/Vendor |
| --- | --- | --- |
| Transistor 702 | 2N2222 | Micro Comm. Components |
| Resistor 704 | 10.0K | 0.1 W, 1% |
| Opto-Isolator 706 | 4N25 | Fairchild Semiconductor |
| Resistor 708 | 1.1K | 0.1 W, 1% |
| Resistor 714 | 10.0K | 0.1 W, 1% |

Illustrative Signal Operations

Figure 8:
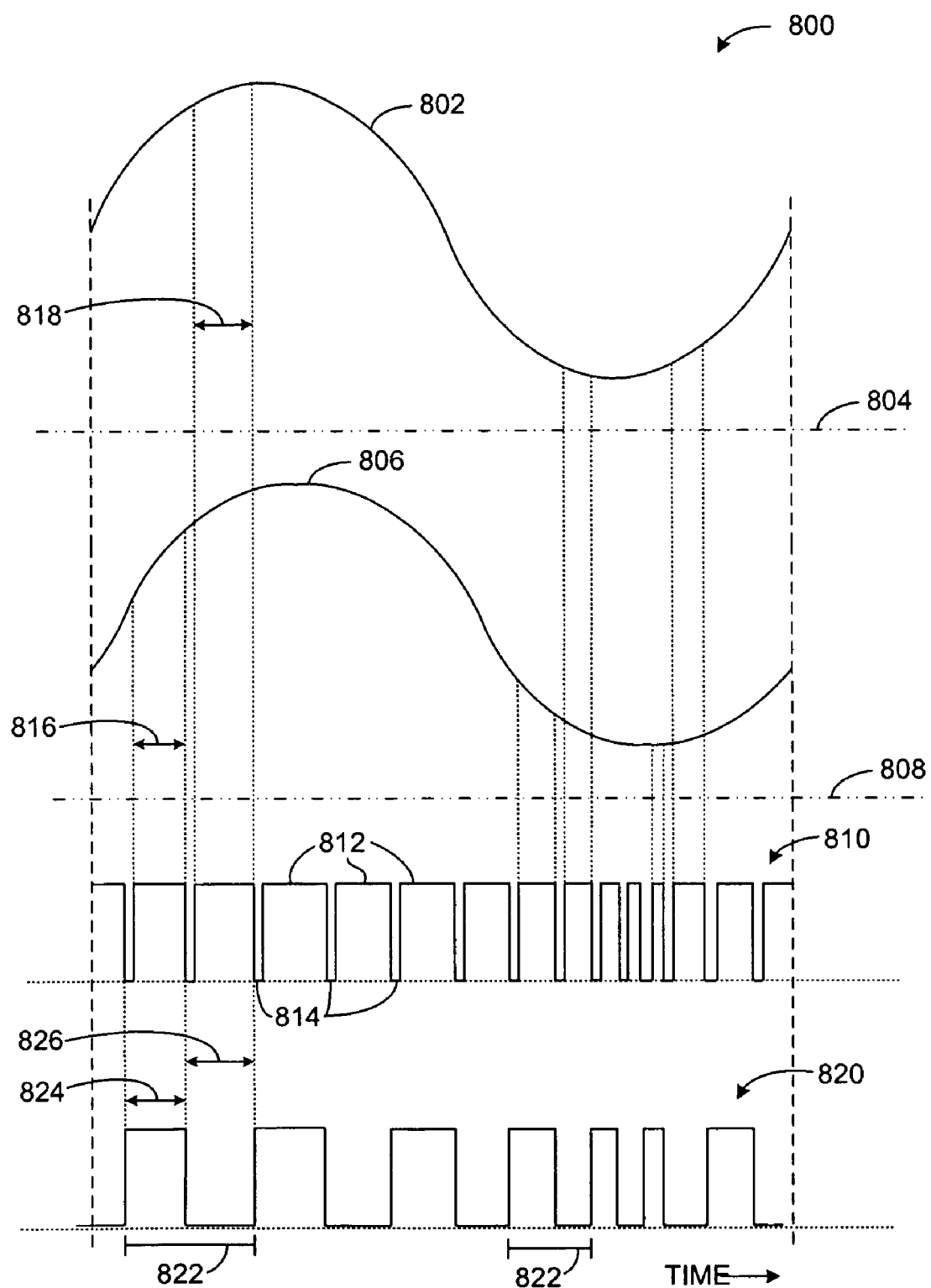
FIG. 8 depicts a signal timing diagram of illustrative signals according to one embodiment.

Attention is now directed to FIG. 8, which depicts a signal timing diagram 800. The diagram 800 is illustrative and non-limiting with respect to the signal derivation circuitry 100 of the present teachings. Therefore, the diagram 800 depicts respective signals and their relationships for purposes of understanding the present teachings. Other operative scenarios including signals whose respective characteristics (e.g., frequency, waveform, magnitude, timing, sampling rate, etc.) differ from those depicted in FIG. 8 are also contemplated by the present teachings.

The diagram 800 includes a scaled and biased voltage signal 802. The signal 802 is illustrative of a signal that can be present at node 228, which corresponds to a load voltage present at node 104A. The signal 802 is substantially sinusoidal in form and is superimposed on a DC bias with reference to a ground level 804. One of ordinary skill in the electrical arts can appreciate that the signal 802 is defined by various characteristics such as peak-to-peak magnitude, frequency, period, etc., and that an exhaustive description of these characteristics is unnecessary for understanding the teachings herein.

The diagram 800 also includes a scaled and biased current signal 806. The signal 806 is illustrative of a signal that can be present at node 332, which corresponds to a load current 108. The signal 806 is substantially sinusoidal in form and is superimposed on a DC bias with reference to a ground level 808. One of ordinary skill in the electrical arts can appreciate that the signal 806 is defined by various characteristics such as peak-to-peak magnitude, frequency, period, etc., and that an exhaustive description of these characteristics is unnecessary for understanding the teachings herein.

The diagram 800 also includes a multiplexed frequency-modulated signal 810. The multiplexed frequency-modulated signal 810 is illustrative of a signal that can be present at node 526, which is the output signal from the oscillator 542. The signal 810 is characterized by a succession of cycles each defined by a respective "ON" period 812, and a respective "OFF" period 814. The length of each ON (i.e., high) period 812 corresponds to the average magnitude of either the signal 802 or 806, depending upon which of these two signals is being sampled during that particular period 812. For illustrative example, the pulse 816 corresponds to sampling the current signal 806, and the pulse 818 corresponds to sampling the voltage signal 802.

In turn, the length of each OFF (i.e., low) period 814 corresponds to the discharge time (Td) of the oscillator 542. During typical operation of the signal derivation circuitry 100, the respective OFF periods 814 are equal.

The diagram 800 further includes a multiplexed frequency-modulated signal 820. The signal 820 is illustrative of a signal that can be present at node 606, which is the divided multiplexed frequency-modulated signal output from the flip-flop 602. The signal 820 oscillates at one-half (divide-by-two representation) of the instantaneous frequency of the signal 810. Furthermore, the signal 820 is characterized by a chronological succession of respective periods 822.

Each period 822 corresponds to—and is essentially an average of—two full cycles (i.e., periods) of the signal 810. Thus, each period 822 corresponds to two consecutive pulses (i.e., signal samplings). As depicted, each period 822 includes an "ON" portion 824 corresponding to a current signal sampling 816 plus one OFF period 814. Additionally, each period 822 includes an "OFF" portion 826 corresponding to a voltage signal sampling 818 plus one OFF period 814. Thus, each period 822 includes two OFF periods 814 (i.e., discharge times Td) of the signal 810.

The signal 820 is illustrative of a (divided) frequency-modulated signal that is provided (i.e., generated) by the signal derivation circuitry 100 of the present teachings. Such a signal 820 is typically coupled to signal processing and/or other control circuitry by way of isolation circuitry 700 for use in controlling a printer or other apparatus. The signal 820 includes a non-linearity attributable to the discharge times 814 present within the multiplexed frequency-modulated signal 810 provided by the oscillator 542. Processing of the signal 820 according to the present teachings is considered with reference to FIG. 9.

First Illustrative Method

Figure 9:
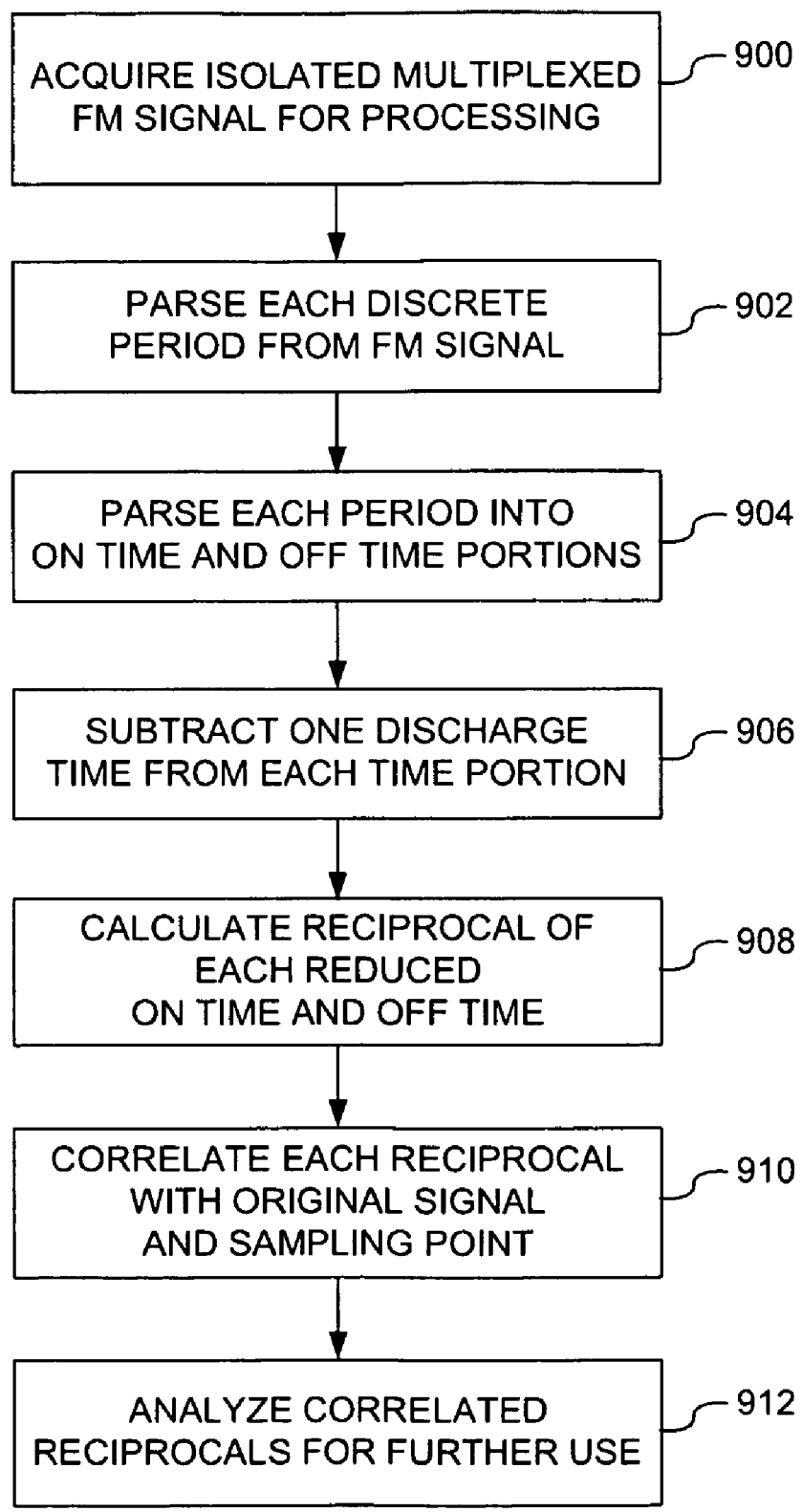
FIG. 9 depicts a flow diagram of a method according to another embodiment.

FIG. 9 is a flow diagram depicting a signal processing method according to one embodiment of the invention. The method of FIG. 9 includes particular operations and order of execution. However, other methods including other operations, omitting one or more of the depicted operations, and/or proceeding in other orders of execution can also be used according to the present teachings. Thus, the method of FIG. 9 is illustrative and non-limiting in nature.

At 900, an isolated, multiplexed frequency-modulated signal 820 (at a node 716) is acquired for processing.

At 902, each period 822 of the signal 716 is discretely identified and parsed for individual manipulation.

At 904, each period 822 is parsed into ON time 824 and OFF time 826 portions for separate treatment.

At 906, one discharge period 814 is subtracted from each of the parsed ON time and OFF time portions separated at 904 above, yielding reduced ON times and OFF times, respectively.

At 908, the reciprocal of each reduced ON time and OFF time is calculated so as to derive a corresponding frequency, having the discharge times 814 (i.e., offset signal content) removed.

At 910, each calculated reciprocal is correlated to a particular point on (or portion of) the signal 810. In this way, time correspondence between each ON time 824 and OFF time 826, and the signal 810, is determined.

At 912, the respective frequency for each reciprocal is used to interpret or otherwise analyze the load voltage and current.

The foregoing method is illustrative of any number of methods contemplated by the present teachings. Such signals can be used in controlling a printer. Numerous other methods consistent with the operations and/or objectives of the present teachings can also be used.

Second Illustrative Embodiment

Figure 10:
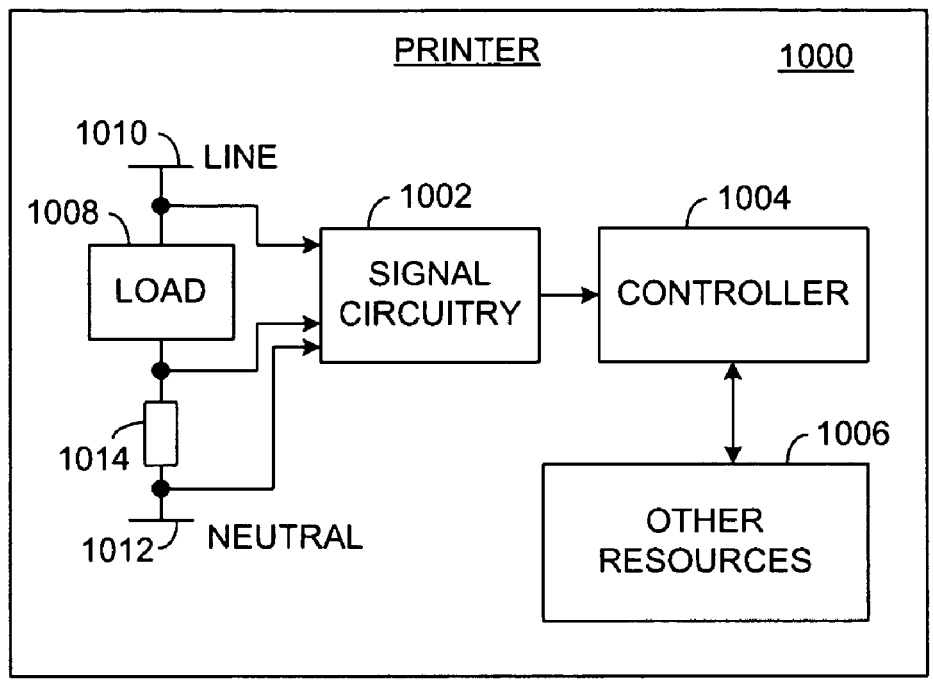
FIG. 10 depicts a block diagram of a printer according to another embodiment.

Attention is now directed to FIG. 10, which depicts a block diagrammatic view of a printer 1000. The printer 1000 is illustrative and non-limiting with respect to the present teachings. Thus, the present teachings contemplate an essentially unlimited number of application scenarios in which voltage, current and/or power monitoring is required and/or desirable.

The printer 1000 includes signal derivation circuitry 1002. In one embodiment, the signal derivation circuitry 1002 is as depicted and described above with respect to FIGS. 2-7, collectively. Other embodiments of signal derivation circuitry 1002, consistent with the present teachings, can also be used. The signal derivation circuitry 1002 is configured to monitor (i.e., sense) voltage and current of a load or loads 1008 of the printer 1000 and to provide a corresponding isolated, multiplexed frequency-modulated signal for use in controlling operations of the printer 1000.

The printer 1000 also includes a controller (or control circuitry) 1004. The controller 1004 is configured to control numerous normal operations of the printer 1000 such as, for non-limiting example, formation of imaging on media, receiving input from a user interface, communicating data to and/or from a network connection (not shown), etc. The control 1004 is configured and coupled so as to have controlling influence over various other resources 1006 of the printer 1000 (e.g., inkjet print head(s), media transport mechanisms, a media drying heater, user input/output circuitry, network communications resources, memory and/or other data storage, etc.).

The printer 1000 also includes a load 1008. The load 1008 can be defined as any electrical load or resource of the printer 1000 for which monitoring of the applied electrical voltage and current is required. For purposes of non-limiting example, it is assumed that the load 1008 is defined by a media drying heater configured to dry inkjet printed media by way of electrical energy (e.g., utility power).

The load 1008 is energized by electrical power from a line-level voltage node 1010, and a neutral-level (with respect to line-level) voltage node 1012. For purposes of non-limiting example, it is assumed that there are normally two-hundred thirty volts (RMS) at sixty Hertz frequency between line-level node 1010 and neutral-level node 1012. Other voltages and/or other frequencies can also be used in other embodiments.

The load 1008 is coupled to neutral node 1012 by way of current sense resistor 1014. The current sense resistor 1014 is configured to exhibit a voltage drop corresponding to the current drawn by the load 1008. In turn, the line-level voltage at node 1010, the neutral-level voltage at node 1012, and the voltage across the resistor 1014 (with respect to node 1012) are coupled to the signal derivation circuitry 1002.

During illustrative, non-limiting operation, the printer 1000 performs as follows: normal printing operations are performed under the control of controller 1004. The signal derivation circuitry 1002 monitors the voltage applied to, and the current carried by, the load 1008. The signal derivation circuitry 1002 also operates to derive corresponding a multiplexed frequency-modulated signal, communicates this signal across an electrical isolation barrier between distinct electrical domains, and provides the resulting isolated signal to the controller 1004.

The controller 1004 is further configured to process the isolated signal provided by the signal derivation circuitry 1002. For example, and not by limitation, the controller 1004 can be configured to perform the method of FIG. 9 as described above. The controller 1004 is also configured to adjust the control of the printer resources 1006 in accordance with the (parsed and processed) signals. For purposes of non-limiting example, it is assumed that the voltage between nodes 1010 and 1012 drops (or sags) below a threshold value. A corresponding signal from the signal derivation circuitry 1002 is sent to the controller 1004, which processes that signal and responds by reducing the energy delivered to the electrical media drying heater 1008 such that the present electrical demands of the printer 1000 are reduced. Other operational scenarios are also possible.

The printer 1000 is illustrative and non-limiting with respect to the present teachings. Furthermore, the printer 1000 is depicted in a simplified form in the interest of understanding. One having ordinary skill in the printing and related arts will appreciate that other printers having respectively varying resources can be configured and used in accordance with the present subject matter.

Second Illustrative Method

Figure 11:
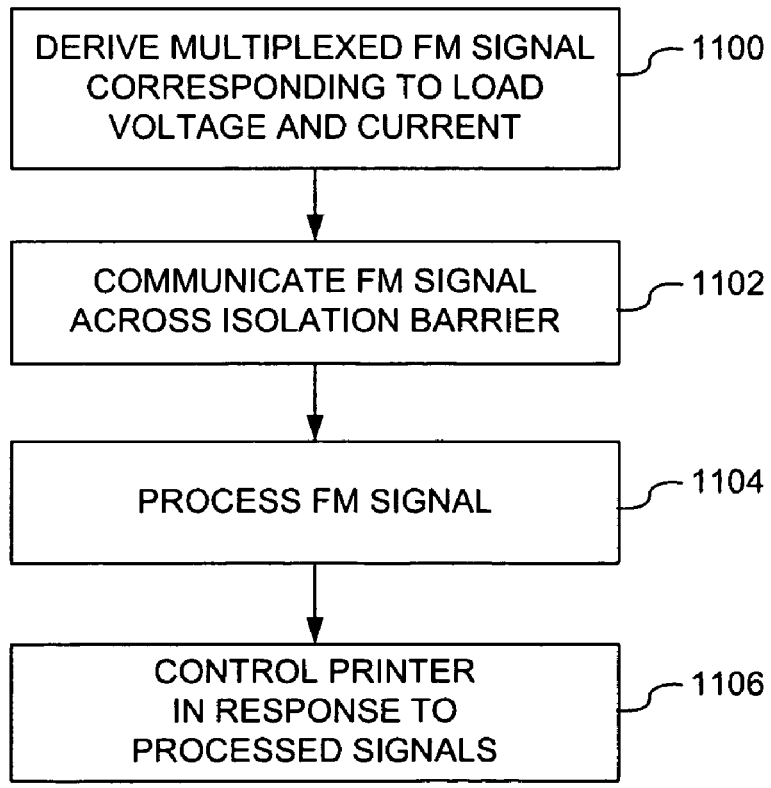
FIG. 11 depicts a flow diagram of a method according to yet another embodiment.

FIG. 11 is a flow diagram depicting a method according to one embodiment of the invention. The method of FIG. 11 includes particular operations and order of execution. However, other methods including other operations, omitting one or more of the depicted operations, and/or proceeding in other orders of execution can also be used according to the present teachings. Thus, the method of FIG. 11 is illustrative and non-limiting in nature.

At 1100, load voltage and current are monitored by signal derivation circuitry, and a corresponding multiplexed frequency-modulated signal representative of the load voltage and current is derived. For purposes of non-limiting example, such signal derivation circuitry can be defined and configured as depicted by FIGS. 2-7, collectively.

At 1102, the multiplexed frequency-modulated signal derived at 1100 above is communicated across an electrical isolation barrier. Such communication results in transferring the signal between distinct electrical domains. The electrical domains can optionally have respectively different voltage ranges.

At 1104, the isolated, multiplexed frequency-modulated signal representative of load voltage and current is provided to a printer controller. The controller acts to process the signal (e.g., remove offset signal content, correlate portions of the signal to sampling points, etc.) accordingly for further use.

At 1106, the processed signals are used to control operations of the printer. For non-limiting example, a media dryer within the printer can be modulated in accordance with power variations experienced by a corresponding power supply. Other control scenarios are also possible.

The foregoing method is illustrative of any number of methods contemplated by the present teachings such that a multiplexed frequency-modulated signal representative of applied voltage and current of a load are derived and communicated across an electrical isolation barrier. As in the method of FIG. 11, such a signal can be processed and used in controlling a printer. Numerous other methods consistent with the operations and/or objectives of the present teachings can also be used.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

Furthermore, specific circuits having specific component (e.g., op-amp 224, capacitor 518, etc.) models and/or values have been described. It is to be understood that other circuit component values and/or make/model designations can also be used in accordance with the present teachings. Thus, the present teachings contemplate the use of other suitable components having respectively varying electrical characteristics.

What is claimed is:

1. An apparatus including printing resources, comprising:
   multiplexer circuitry configured to provide a multiplexed signal by alternately sampling a first signal and a second signal;
   modulator circuitry configured to provide a first multiplexed frequency modulated signal by controlling an oscillator using the multiplexed signal;
   logic circuitry configured to provide a second multiplexed frequency-modulated signal by frequency dividing the first multiplexed frequency-modulated signal; and
   control circuitry configured to control one or more operations of the printing resources by way of the second multiplexed frequency-modulated signal.

2. The apparatus according to claim 1, the logic circuitry configured such that each period of the second multiplexed frequency-modulated signal including a first portion corresponding to the first signal and a second portion corresponding to the second signal.

3. The apparatus according to claim 1, the control circuitry further configured to process the second multiplexed frequency-modulated signal so as to derive a first processed signal and a second processed signal, the processing including removing offset signal content from the second multiplexed frequency-modulated signal, the control circuitry configured to control one or more operations of the printing resources by way of the first and second processed signals.

4. The apparatus according to claim 1 further comprising:
   voltage processing circuitry configured to provide the first signal by scaling and biasing a voltage applied to a load; and
   current processing circuitry configured to provide the second signal by scaling and biasing a voltage corresponding to a current through the load.

5. The apparatus according to claim 1, the logic circuitry further configured to provide a first sampling control signal and a second sampling control signal by way of frequency dividing the second multiplexed frequency-modulated signal.

6. The apparatus according to claim 1, the multiplexer circuitry further configured to provide the multiplexed signal by alternately sampling the first signal and the second signal and a third signal, the third signal defined by a calibration reference signal.

7. A printing apparatus, comprising:
   an electrical load;
   signal derivation circuitry configured to provide a multiplexed frequency-modulated signal corresponding to a voltage applied to the electrical load and a current through the electrical load; and
   signal processing circuitry configured to derive a first processed signal and a second processed signal from the multiplexed frequency-modulated signal, the printing apparatus configured to be controlled using the first and second processed signals.

8. The printing apparatus according to claim 7, the signal derivation circuitry further configured to alternately sample a first signal and a second signal, the first signal corresponding to the voltage applied to the electrical load, the second signal corresponding to the current through the electrical load.

9. The printing apparatus according to claim 7, the voltage applied to the electrical load being an alternating-current voltage.

10. The printing apparatus according to claim 7, the signal derivation circuitry including an oscillator configured to provide the multiplexed frequency-modulated signal, the oscillator operating by way of charging and discharging a capacitor.

11. The printing apparatus according to claim 7, the signal derivation circuitry further configured to communicate the multiplexed frequency-modulated signal across an optical isolation barrier.

12. The printing apparatus according to claim 7, the signal processing circuitry further configured to remove offset signal content from the multiplexed frequency-modulated signal.

13. A method, comprising:
   deriving a multiplexed frequency-modulated signal corresponding to a load voltage and a load current;
   communicating the multiplexed frequency-modulated signal across an electrical isolation barrier from a first voltage level to a second voltage level;

processing the multiplexed frequency-modulated signal so as to derive a first processed signal and a second processed signal; and using the first and second processed signals to control operations of a printer.

14. The method according to dam 13, the processing further comprising removing discharge times of an oscillator operating period from the multiplexed frequency-modulated signal.

15. The method according to claim 13, the processing further comprising correlating the first and second processed signals with respective portions of the multiplexed frequency-modulated signal.

* * * * *

UNITED STATES PATENT AND TRADEMARK OFFICE
CERTIFICATE OF CORRECTION

| | | |
|---|---|---|
| PATENT NO. | : 7,911,286 B2 | Page 1 of 1 |
| APPLICATION NO. | : 12/417442 | |
| DATED | : March 22, 2011 | |
| INVENTOR(S) | : David E Smith | |

It is certified that error appears in the above-identified patent and that said Letters Patent is hereby corrected as shown below:

IN THE CLAIMS:

In column 15, line 6, in Claim 14, delete "dam" and insert -- claim --, therefor.

Signed and Sealed this
Ninth Day of August, 2011

David J. Kappos
*Director of the United States Patent and Trademark Office*